Sept. 19, 1967 V. L. NICHOLS ETAL 3,342,026
METHOD AND APPARATUS FOR PRODUCING TEXTURED YARN
Filed Sept. 16, 1964 7 Sheets-Sheet 7
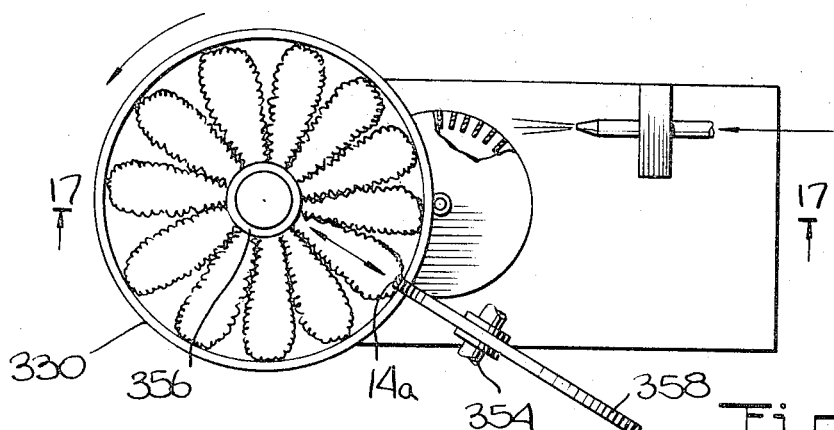
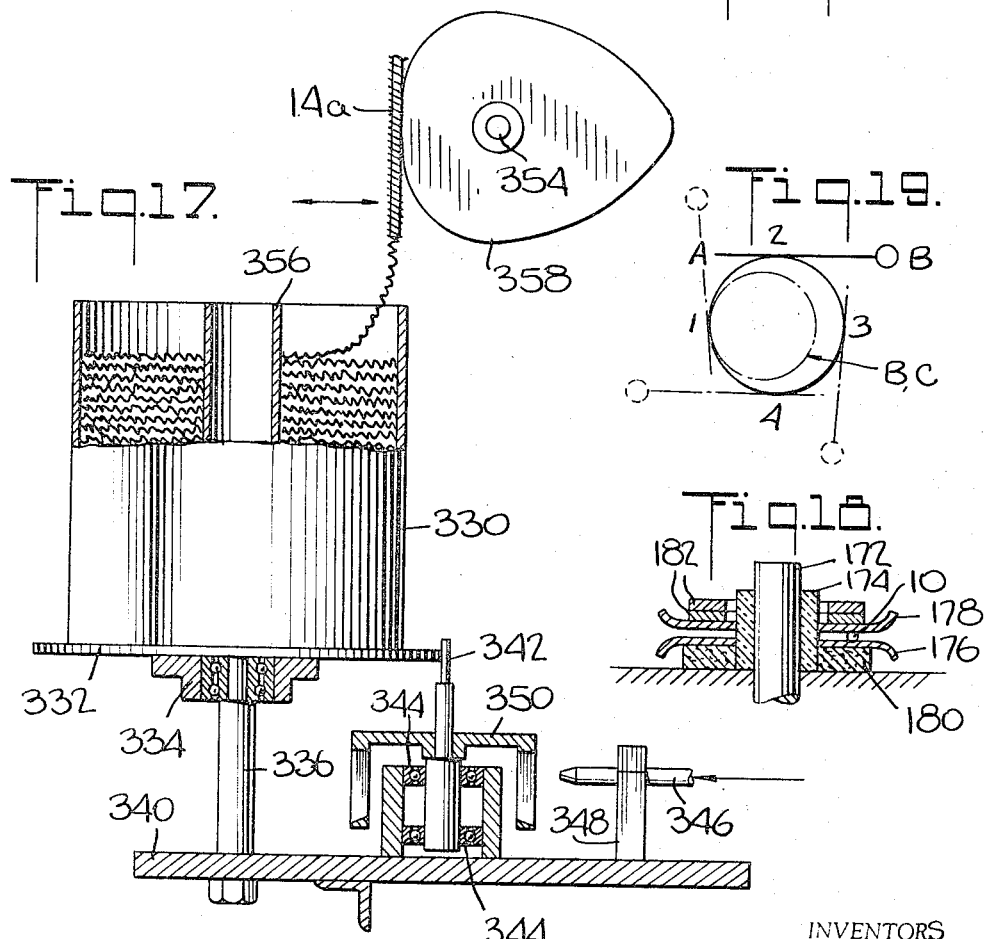
INVENTORS
VICTOR L. NICHOLS
IVAN J. GARSHELIS
BY
ATTORNEY United States Patent Office 3,342,026
Patented Sept. 19, 1967

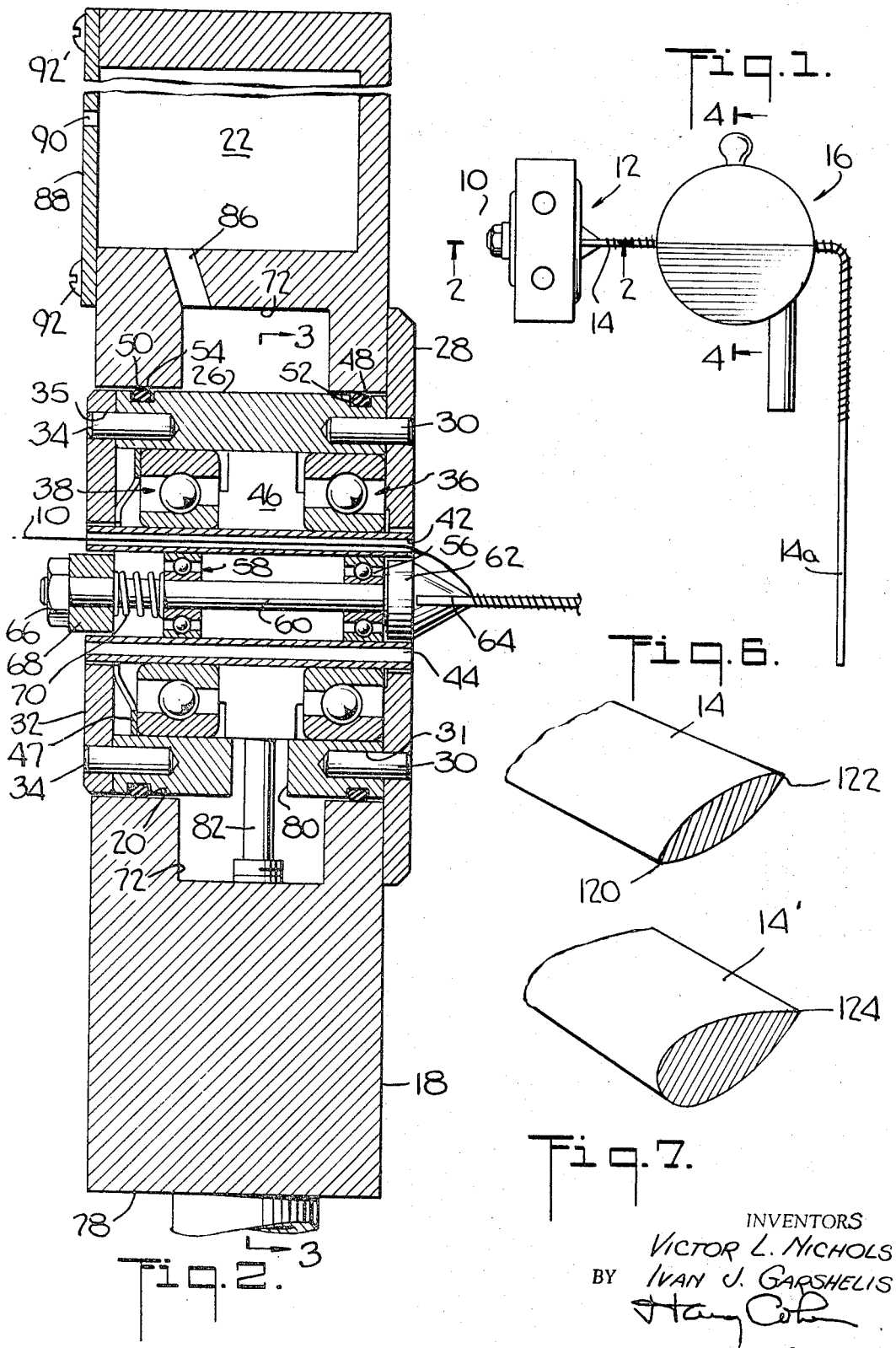

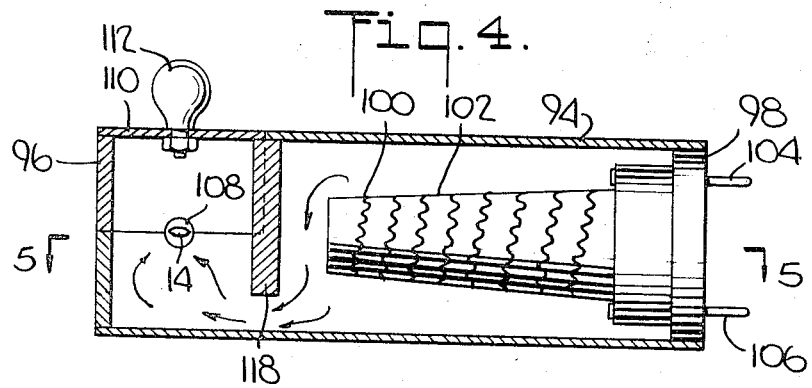
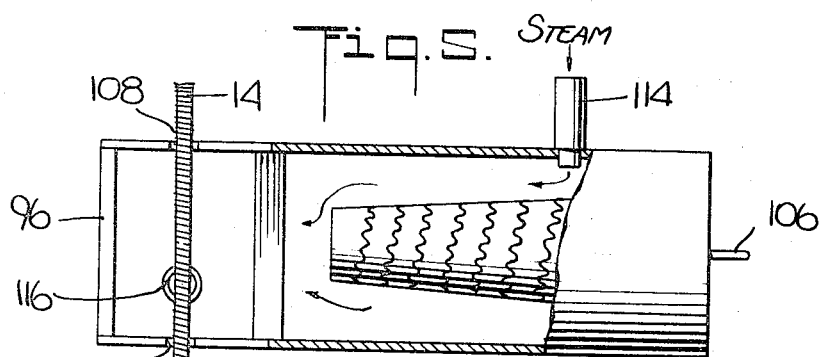
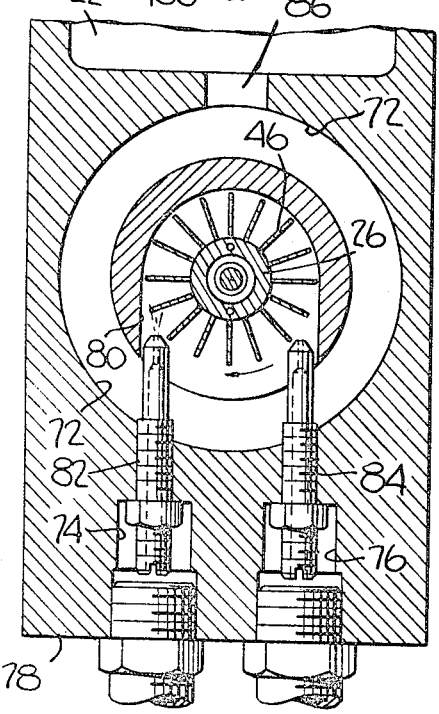
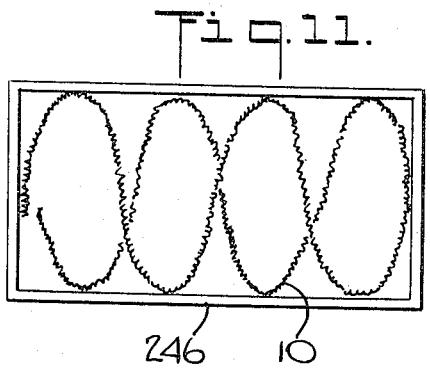

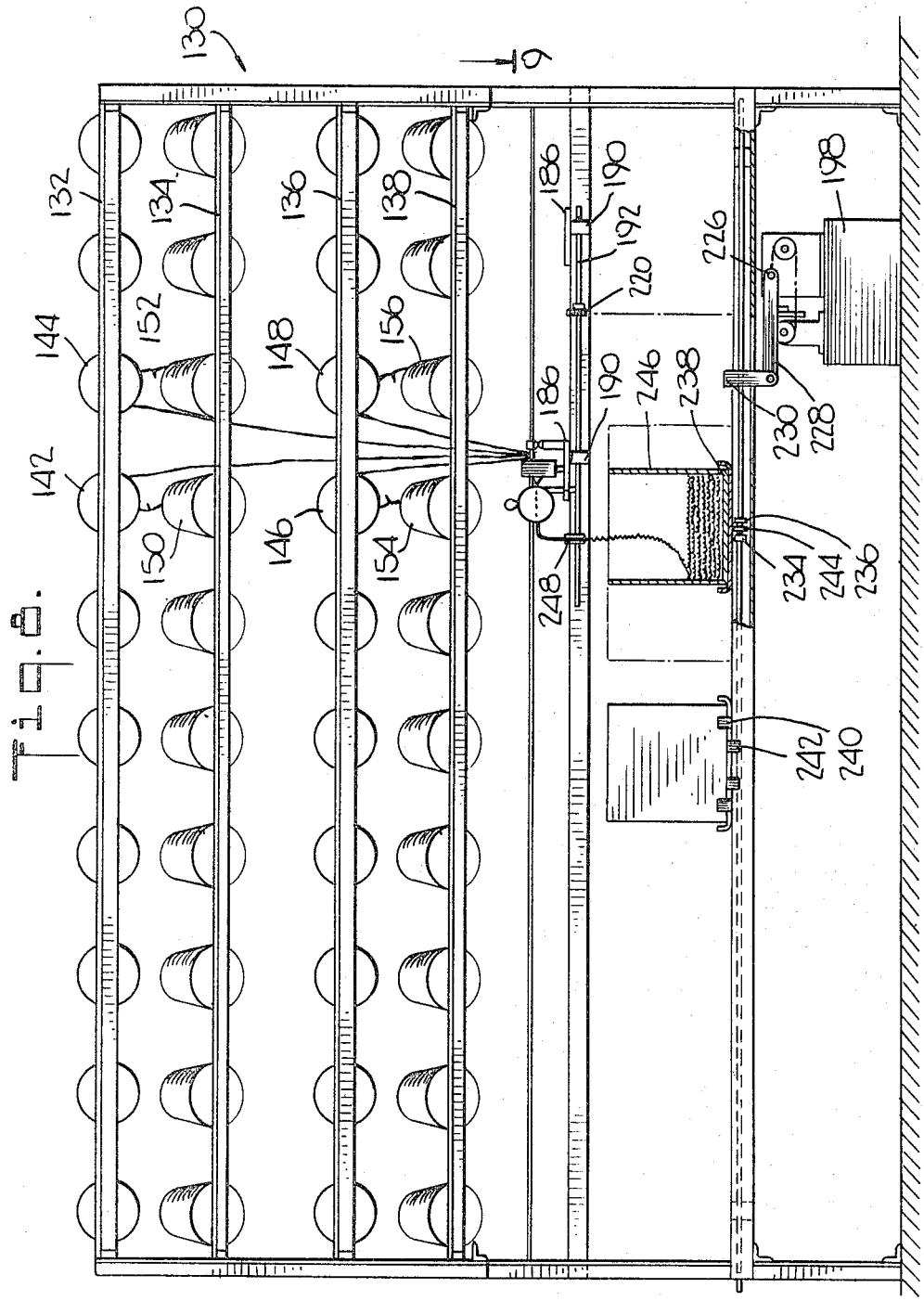

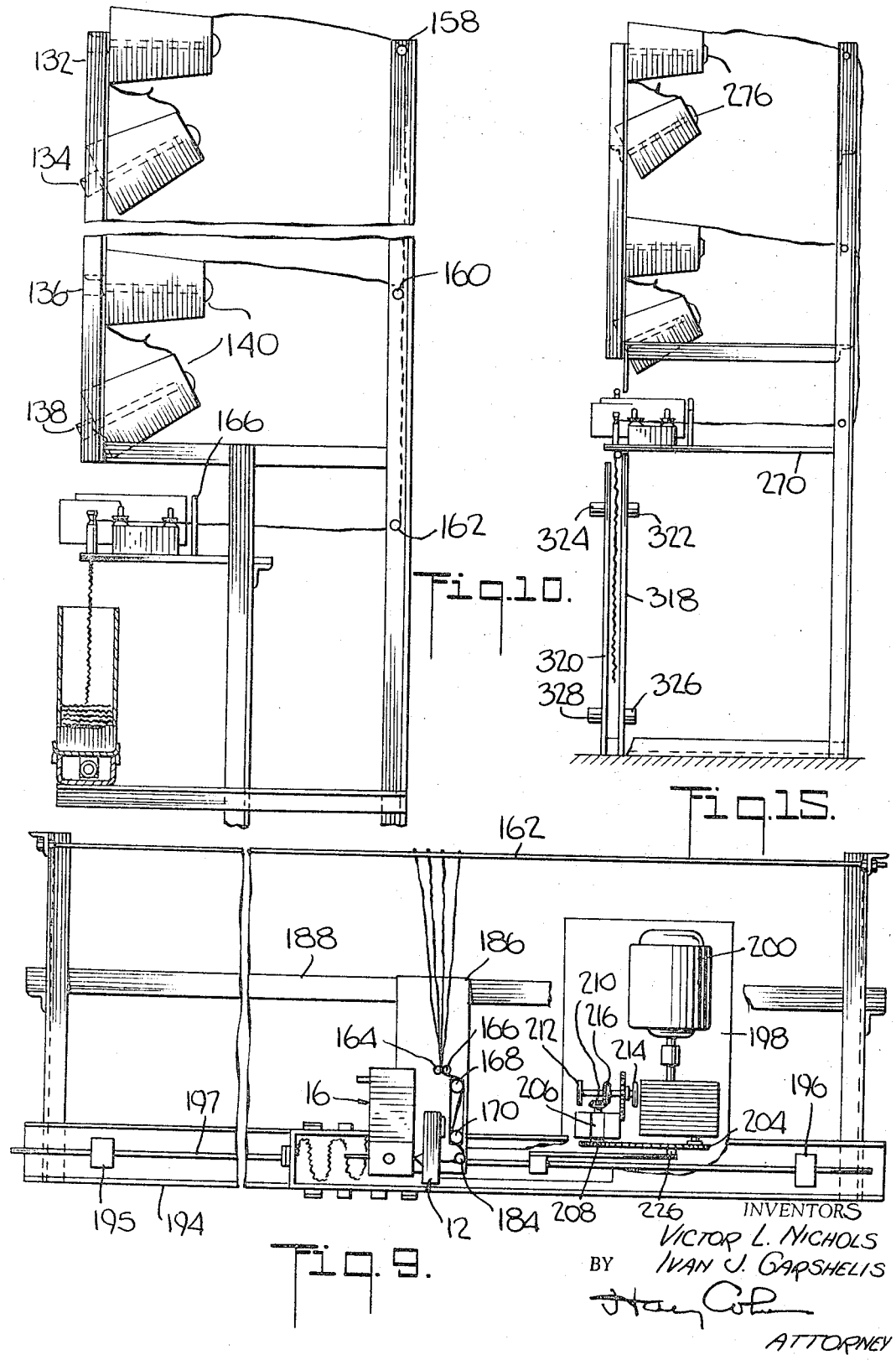

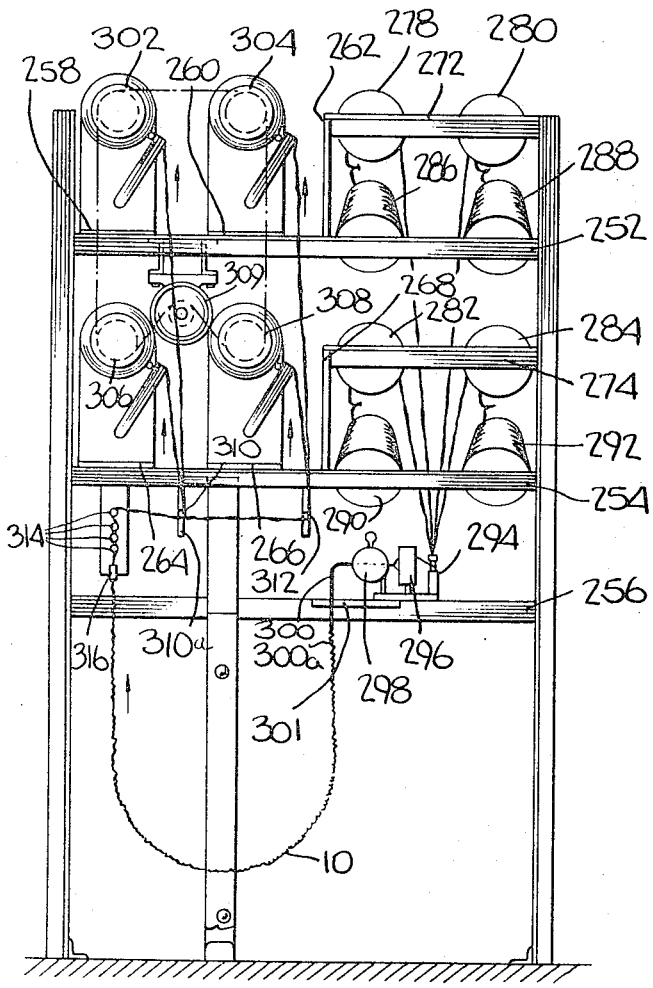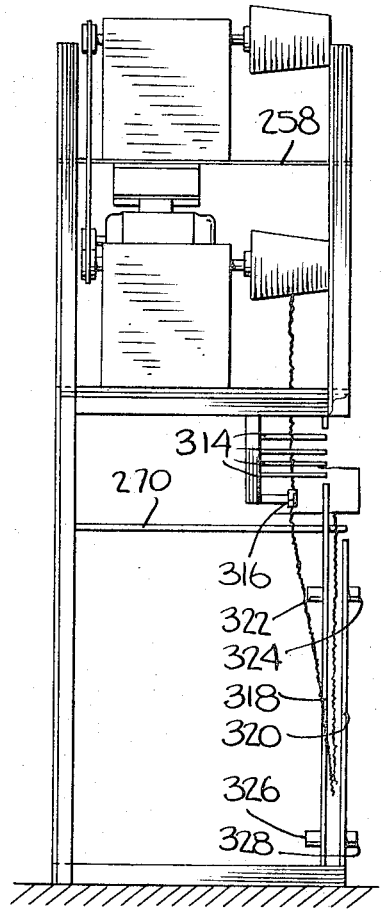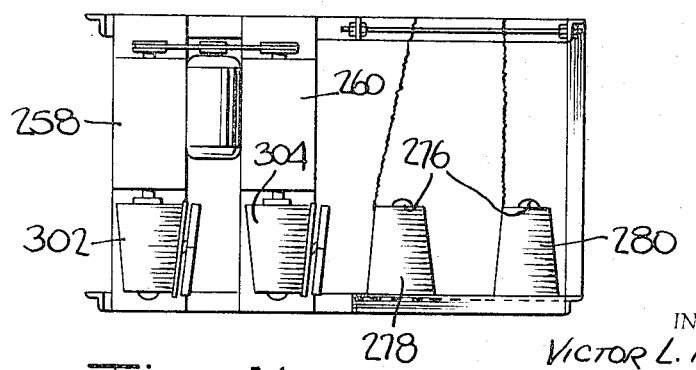

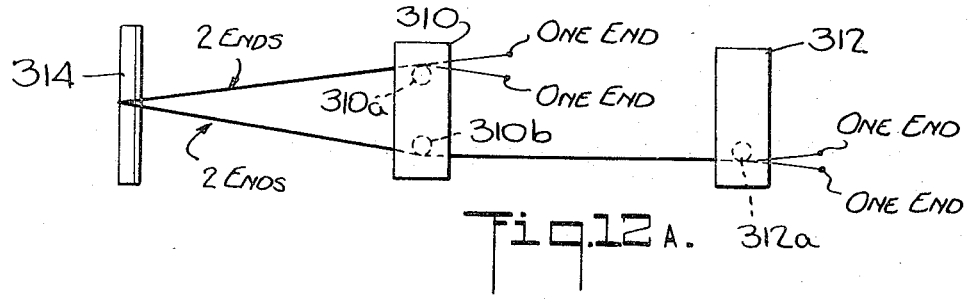
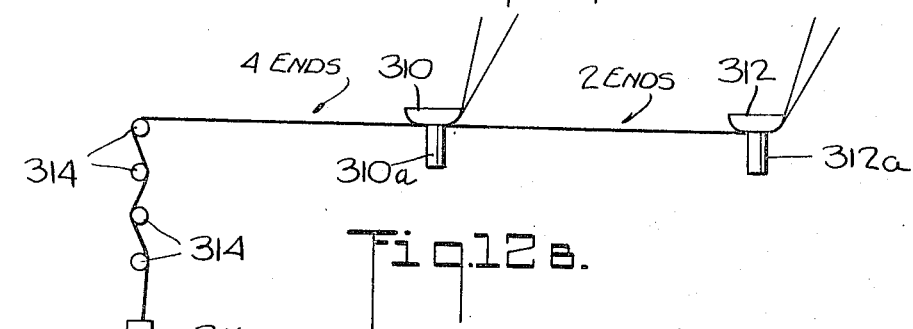
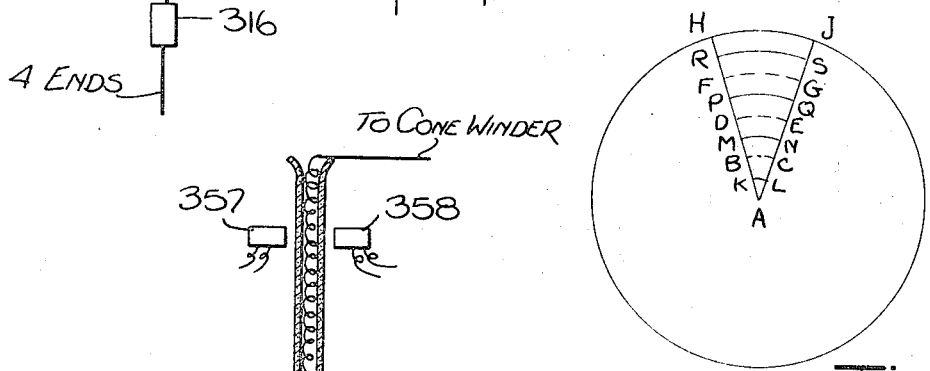
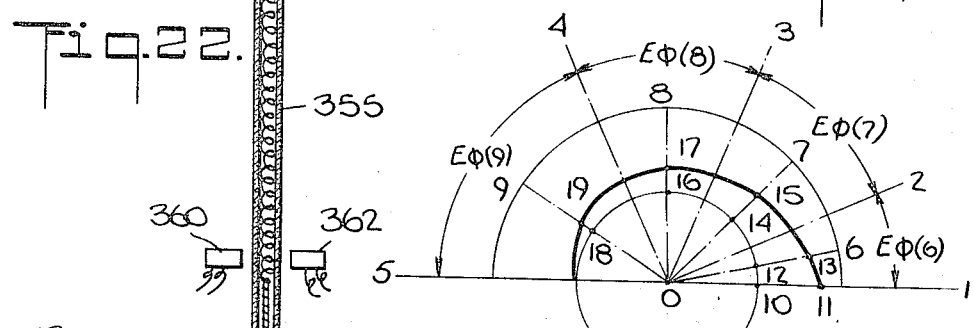
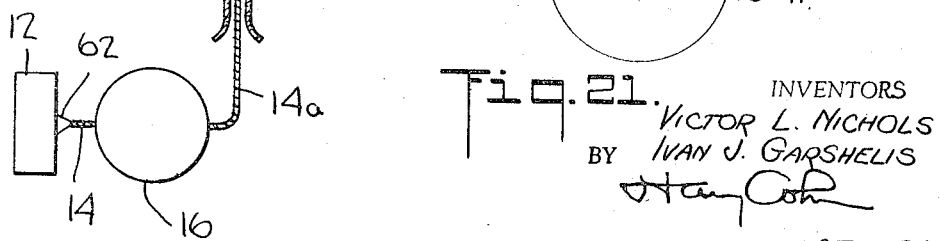

3,342,026
METHOD AND APPARATUS FOR PRODUCING TEXTURED YARN
Victor L. Nichols, Bergenfield, and Ivan J. Garshelis, Clark, N.J., assignors to David & David, Inc., Long Island City, N.Y., a corporation of New York
Filed Sept. 16, 1964, Ser. No. 396,957
34 Claims. (Cl. 57—34)

ABSTRACT OF THE DISCLOSURE

A yarn winding system includes a mandrel having an elongated marginal edge portion which is thin in cross-section, approaching a sharp, but not cutting edge, a spinning means for tightly winding the yarn about the mandrel as a helix, whereby the yarn is wound about said mandrel successively in close engagement with at least a longitudinally extending portion of said thin edge portion of said mandrel and is thereby kinked at a multiplicity of points spaced from each other longitudinally of the yarn. The kinks are set while the yarn is on the mandrel. The yarn may be advanced off the mandrel into a container so that equal lengths of yarn occupy equal areas of the bottom of the container.

---

This invention relates to textured yarn and more particularly to a crimped yarn having high bulk and stretch characteristics, and to an apparatus and method for providing such yarn.

Texturing is the permanent introduction of crimps, loops, coils, or crinkles into yarn, thereby providing the yarn with greater bulk, resilient stretch, increased absorbency and improved hand. The classical method of texturing involves twisting or spiraling the yarn, heat setting the twisted yarn in a package, and finally untwisting the yarn. Another method involves false twisting the yarn, heat setting the twisted yarn and finally untwisting the yarn. Yet another method involves heating the yarn, pulling the yarn over an edge at an acute angle and coiling the yarn. Still another method involves stuffing the yarn into a confined and heated chamber and then cooling the yarn. Even another method involves knitting the yarn into a fabric, heat setting the fabric, and then unraveling the fabric. A last method involves overfeeding a yarn into a constricted chamber and applying an air jet to the chamber, forming loops and tangles in the yarn, providing a bulky but not stretchable yarn. The fiber produced by each of these methods when stretched tends to pull out into a straight fiber, in the manner of a helical wire tension spring, and to lose its resiliency.

It is, therefore, an object of this invention to provide a textured yarn having improved resiliency characteristics.

Another object of this invention is to provide a yarn having resiliency up to its breaking point.

Yet another object of this invention is to provide a yarn having a high bulk characteristic.

Still another object of this invention is to provide an apparatus and a method for producing such yarn at a very rapid rate.

Even another object of this invention is to provide an apparatus and a method for producing such yarn as a continuous process without intermediate winding steps.

An additional object of this invention is to provide an apparatus and a method for packaging the yarn into containers from which it may be readily removed.

A feature of this invention is a means for providing spaced apart stress concentrations in a yarn and a means for permanently setting these stress concentrations.

Another feature of this invention is a fiber having permanent spaced apart stress concentrations.

Yet another feature of this invention is a container and a means for uniformly distributing the yarn within this container.

These and other objects, features and advantages of this invention will be made clear by the following detailed description thereof taken in conjunction with the accompanying drawings wherein:

FIG. 1 is a front view of the yarn winding assembly and the heating chamber assembly;

FIG. 2 is a top view, in section taken along line 2—2 of FIG. 1, of the yarn winding assembly;

FIG. 3 is a partial side view, in section taken along line 3—3 of FIG. 2, of the yarn winding assembly;

FIG. 4 is a side view, in section taken along line 4—4 of FIG. 1, of the heating chamber assembly;

FIG. 5 is a top view, in section taken along line 5—5 of FIG. 4, of the heating chamber assembly;

FIG. 6 is a partial perspective view of one embodiment of a mandrel for the yarn winding assembly;

FIG. 7 is a partial perspective view of another embodiment of a mandrel for the yarn winding assembly;

FIG. 8 is a front view of an assembly for winding and setting yarn and for storing the yarn in a container;

FIG. 9 is a top view, taken along line 9—9 of FIG. 8, of the assembly;

FIG. 10 is a right end view of the assembly of FIG. 8;

FIG. 11 is a top view of the distribution of the yarn in the container provided by the assembly of FIG. 8;

FIG. 12 is a front view of another embodiment of an assembly for winding and setting yarn and for winding the yarn into packages;

FIG. 12A is a top view of a detail of FIG. 12;

FIG. 12B is a front view of a detail of FIG. 12;

FIG. 13 is a left end view of the assembly of FIG. 12;

FIG. 14 is a top view of the assembly of FIG. 12;

FIG. 15 is a right end view of the assembly of FIG. 12;

FIG. 16 is a top view of another embodiment of a container and means for distributing the yarn uniformly therein;

FIG. 17 is a front view of the assembly of FIG. 16, partly in section taken along the line 16—16 of FIG. 16;

FIG. 18 is a view in elevation, partially in cross-section, of a tensioning device for the yarn;

FIG. 19 is a diagrammatic showing of the construction of a cam for use with rectangular container;

FIGS. 20 and 21 are diagrammatic showings of the construction of a cam for use with a cylindrical container; and FIG. 22 is a front view of a modified yarn winding assembly and mandrel arrangement.

As shown in FIG. 1, the yarn 10 is wound by a yarn winding assembly 12 about a mandrel 14, passed through a heating chamber assembly 16 while on the mandrel, and subsequently cooled.

As shown in FIGS. 2 and 3, the yarn winding assembly comprises a housing block 18 having a central longitudinal bore 20, and a muffler chamber 22. A turbine assembly 24 is disposed within the longitudinal bore 20. The turbine assembly comprises a sleeve 26, a front cover 28 which is fixed to the sleeve by screws (not shown), a plurality of registering pins 30 carried by said cover and fitting into recesses 31 in said sleeve. A back cover 32 which is similarly fixed to the sleeve and has a plurality of registering pins 34 fitted into recesses 35 in said sleeve is similarly secured to said sleeves by screws (not shown). A pair of spaced apart thrust bearings 36 and 38 are fitted within the sleeve 26 to rotatably support a tubular spinner 40. Two diametrically spaced apart longitudinal holes 42 and 44 are formed in the spinner. A turbine rotor 46 having a plurality of blades is fixed to the spinner 40 and rotates between the bearings 36 and 38. An annular spring 47 is disposed between the rear bearing 38 and the back cover 32, to load the thrust bearing races against the balls for high speed operation. The sleeve 26 is sealed within the bore 20 of the housing block by means of two "O" rings 48 and 50 respectively mounted in annular grooves 52 and 54 in the sleeve.

Two spaced apart thrust bearings 56 and 58 are fitted within the tubular spinner 40. A shaft 60 is fitted for rotation within these bearings. A cone 62 is fixed to the front end of the shaft, which also has a slot 64 therein. A nut 66 is threaded to the rear end of the shaft, and a spacer 68 and a helical compression spring 70 are disposed on the shaft between the nut and the rear bearing 58. The spring loads the thrust bearing races for high speed operation. The upper rear end of the mandrel 14 is fixed within the slot 64.

It will be seen that the spinner 40 and rotor 46 are thus free to rotate with respect to both the housing block 18 and the mandrel 14. The bore 20 includes an annular portion 72. Two transverse bores 74 and 76 extend from the left end 78 of the block through to the annular portion 72, as shown in FIG. 3. An elongated slot 80 is provided through the sleeve 26 adjacent the bores 74 and 76. Two nozzles 82 and 84 are respectively threaded into the bores 74 and 76. The outlet ends of these nozzles pass into the slot 80 and are closely adjacent the rotor. Only one nozzle is utilized at any time. If the nozzle 82 directs air at the turbine, as shown in FIG. 3, the turbine will turn clockwise; if the nozzle 84 is utilized, the turbine will turn counter-clockwise. A constricted passageway 86 connects the annular bore portion 72 with the muffler chamber 22. A cover plate 88 having an outlet 90 therethrough is fixed over the muffler chamber 22 by a plurality of screws 92. The air from one of the nozzles impinges on the blades of the turbine rotor and rotates therewith, the air escapes into the annular bore portion 72, through the passageway 86, into the chamber 22 and finally out through the outlet 90. As the rotor rotates, it rotates the spinner 40. The lower portion of the mandrel is constrained, as will be discussed hereinafter, and thus the shaft 60 remains relatively stationary within the rotating spinner.

One or more ends of yarn 10, shown as a single end in FIG. 2, are passed through one of the holes 42 or 44, shown as 42, spiraled around the cone, and wrapped around the mandrel. For each rotation of the spinner a turn of yarn is wrapped around the mandrel and abuts the next preceding turn of the yarn on the mandrel. The turns on the mandrel do not rotate, but rather conform closely to the cross-section of the mandrel. As new turns are wound from the cone onto the mandrel, they push the preceding turns along the length of the mandrel. Preferably, the mandrel is slightly tapered longitudinally from the tip of the cone 62 along a short distance from said tip to facilitate the movement of the turns of the yarn along the mandrel without, however, impairing the close conformation of the turns of the yarn to the mandrel.

As shown in FIGS. 1, 4 and 5, the mandrel, and the yarn wound therearound, passes through a heating chamber assembly 16. This assembly comprises a tubular shell 94, closed at the front and rear ends by plates 96 and 98, respectively. An electrical heater element 100 is wound on a ceramic cone 102 fixed to the rear plate 98, and has insulted terminal lugs 104 and 106 extending through and beyond this plate. A diametrical hole 108 passes through the tubular shell 94 in the front portion of the shell, to pass the mandrel through the shell. A portion 110 of the shell is cut away along a line passing through the hole 108 to form a removable access plate, and has a handle 112 fixed thereto. A horizontal steam inlet 114 is fitted to the side of the rear portion of the shell, and a condensed water outlet 116 is fitted to the bottom of the front portion of the shell below the mandrel. A baffle plate 118 is fixed within the shell between the cone 102 and the mandrel 14 to prevent exposure of the yarn on the mandrel to radiant heat from the electrical heater element 100 and to prevent the direct flow of steam from the inlet to the mandrel. Steam entering through inlet 114 is superheated by the heater to remove all water and then passes around the baffle plate to heat the yarn on the mandrel.

As shown in FIG. 6, the mandrel 14 is substantially of flattened elliptical cross-section. The two marginal edge portions 120 and 122 provide two kinks or sharp reflexes or bends per turn of yarn. As shown in FIG. 7, the mandrel 14' is substantially of flattened tear-drop cross-section, and its edge 124 provides one kink per turn of yarn. The mandrels are made with edge portions having as sharp an included angle and radius as will not cut the yarn, and the yarn is wrapped in close engagement with said edge portion. The spinner is preferably operated at a high speed. We have found that a speed of 50,000 revolutions per minutes is advantageous, although said spinner may be operated with good results at speeds lower or higher than 50,000 r.p.m. consistent with adequate heating of the yarn on the mandrel. In crimping fibers for knitting purposes, a mandrel having a width between edges of .10 to .01 in., a thickness between flats of .02 to .005 in., and an edge radius of .003 to .005 in. has been found to be effective. In crimping fibers for weaving purposes, a mandrel having a width of .025 in., a thickness of .015 in., and an edge radius of .003 in. has been advantageously utilized.

As shown in FIG. 1, the mandrel passes through and beyond the heating chamber and then down. As the yarn passes through the heating chamber, it is softened and thereafter as it passes into the ambient atmosphere the yarn is effectively cooled and concomitantly hardened before the yarn leaves the mandrel, thus making the stress concentrations in the yarn permanent. A greater temperature differential, if desired, may be provided by passing the yarn through a refrigeration chamber, not shown here. In working with acetate yarn, for example, superheated steam at 260° F. and 14.7 p.s.i. absolute provided satisfactory results.

As shown in FIGS. 8, 9 and 10, a plurality of ends of yarn may be concurrently processed by a single yarn twisting assembly and a single heating chamber assembly. In these figures an arrangement is shown for five independent sets of twisting and heating assemblies; each set of assemblies processing four ends of yarn. A creel or frame 130 has four horizontal bars 132, 134, 136 and 138. A plurality of rods 140 are mounted in spaced-apart relationship along the bars. The rods on the bars 132 and 136 are substantially horizontal, while the rods on the bars 134 and 138 are at an angle up from the horizontal. A package or cone of yarn may be slid onto each rod. The cones 142, 144, 146 and 148 supply yarn directly to the yarn twisting assembly. The cones 150, 152, 154 and 156 are each back-up cones for the supply cones, respectively. For example, the trailing end of the yarn on the cone 142 is tied to the leading end of the yarn on the cone 150. When the cone 142 is exhausted, the cone 150 will immediately supply yarn directly to the yarn winding assembly.

The yarn ends from the upper supply cones 142 and 144 pass over a horizontal rod 158, the yarn ends from the lower supply cones 146 and 148 pass over a horizontal rod 160, all four yarn ends pass under a horizontal rod 162 and between two upstanding guide posts 164 and 166. From the guide posts the yarns are doubled around between two tension devices 168 and 170. As shown in FIG. 18, each device comprises a metal center post 172, a ceramic tube 174 slipped over the center post, two smooth metal cupped washers 176, 178, a felt washer 180 under the bottom cupped washer, and several metal washers 182 on top of the top cupped washer to increase the weight on the several ends of yarn 10 (only one end shown) running between the cupped washers.

From the tension devices 168 and 170, the four ends of the yarn are brought approximately 120° around in a groove in a guide post 184, to the rear of the yarn winding assembly 12. During the rotation of the yarn spinner 40, the yarn ends are twisted coaxially around each other adjacent the inlet end of hole 42 of said spinner, the twist being an "S" twist or a "Z" twist depending upon the direction of rotation of the spinners. The yarn ends thus twisted around each other pass through the longitudinal hole 42 of the spinner 40, over the cone 62, and are wound around the mandrel 14 forming a helical winding. Said helical winding is of "Z" wound configuration when said twist of the yarn ends around each other is an "S" twist and is of an "S" wound configuration when said twist of the yarn ends around each other is a "Z" twist. Air under pressure enters the nozzle 82, from a source, not shown, and is directed against the turbine blades, rotating the spinner and closely winding the ends of the yarn around the mandrel. It should be noted that the turns of the four ends of yarn are in phase as wound around the mandrel. The spent air is exhausted through the muffler to the atmosphere.

As succeeding turns of yarn are wound around the mandrel they push the preceding turns along the mandrel through the hole 108 into the heating chamber assembly 16. Steam enters the shell 94 through the inlet 114 from a source, not shown, is superheated by the electrical heater element 100, which is energized by a source, not shown, and passes around the baffle plate 118 to heat the yarn on the mandrel. Steam has been chosen to heat the yarn because of its excellent heat transfer characteristic and penetrating ability. Other heat transfer means, such as radiant gas or electrical heaters may be used. Water condensed from the steam in the shell 94 passes out through the outlet 116 and is collected by a sump, not shown.

The heated turns of yarn are pushed along the mandrel 14 out of the heating chamber assembly, around a bend in the mandrel, and along a down-hanging portion of the mandrel 14a.

The guide posts 164 and 166, the tension devices 168 and 170, the guide post 184, the yarn winding assembly 12 and the heating chamber assembly 16 are all mounted on a platform 186 fixed to a horizontal bar 188 in the frame 130. A platform 186 is provided for each of the five positions shown in FIG. 8. A bearing 190 is fixed below each platform 186, and a shaft 192 is rotatably mounted in these bearings. A horizontal channel 194 is fixed, web down and edges up, to the frame 130. A plurality of bearings 196 is fixed on the web, and a rod 197 is mounted for reciprocation in these bearings. A platform 198 is fixed below the frame 130, and has fixed thereon an electric motor 200 which is energized by a source, not shown, and coupled to a speed reducer 202 having an output shaft with a sprocket wheel 204 fixed thereto. A bearing 206 is fixed to the platform and has a shaft therein carrying a sprocket wheel 208 at one end and a miter gear 210 at the other end. A pair of bearings 212 and 214 have a shaft therebetween carrying a miter gear 216, engaging the gear 210, and a sprocket wheel 218. A sprocket wheel 220 is fixed to the shaft 192 and an endless sprocket chain 222 interconnects the wheels 220 and 218. An endless sprocket chain 224 interconnects the wheels 204 and 208. The chain 224 carries a pin 226 to which is pivotally coupled one end of a link 228. The other end of the link is pivotally coupled to a bracket 230, which passes through a slot 232 in the web of the channel 194, and is fixed to the rod 197.

At each of the five positions of the frame 130, a pair of spaced-apart collars 234 and 236 are fixed to the rod 197. Above each set of collars is a slidable platform 238 riding on the edges of the channel 194. The platform has a plurality of downturned ears 240, upturned ears 242, and a central depending yoke 244. The yoke fits between the two collar 234, 236, the downturned ears engage the outside of the channel, while the upturned ears engage a rectangular, open topped box 246, supported on the platform 238.

A cam 248 is fixed at each of the five positions to the shaft 192. The periphery of this cam 248 engages the hanging down portion 14a of the mandrel 14. When the motor 200 is energized, it rotates the shaft 192 via the sprocket chain 222, and it reciprocates the rod 197 via the sprocket chain 224. Thus the cam 248 is rotated at a constant speed, deflecting the hanging-down portion 14a of the mandrel from side to side while the box 246 is reciprocated to and fro with substantially uniform motion. Of course, the yarn is pushed down the mandrel, passing between the mandrel and the cam.

It is desirable that the box be filled uniformly, level by level, and completely, as if a liquid were being poured into the box. Should the box be filled incompletely, as with a cone shape, there would be a tendency for the cone to fall over, jumbling the layers of yarn. When the yarn would then be removed, it would be an unravelable snarl. It is advantageous to lay the yarn down in the box in a manner such that as the yarn falls off the end of the mandrel at a steady rate, it will be deposited as equal amounts of yarn on equal areas of the container bottom, regardless of where that area may be. As seen in FIG. 11, the yarn may be laid down within a rectangular box in an oscillatory wave, each traversal of the length of the box being slightly out of phase with the preceding traversal. To achieve this end as the box is reciprocated with substantially constant motion, the cam 248 is designed as a "constant velocity cam."

To construct the cam 248, any convenient base circle B.C. is used, as shown in FIG. 19. The arm AB pivots about the point B and is shown in solid line at the midpoint of rise of the cam, i.e. 90°.

(1) Start at position 1, and draw the arm AB at the low point of the desired motion.
(2) At position 2, draw the arm AB at its midpoint of rise.
(3) At position 3, draw the arm AB at its peak of rise.
(4) At position 4, draw the arm AB at its midpoint of fall.
(5) Draw the cam peripheral surface tangent to the arm AB at its various positions.

For greater accuracy use more points, dividing the 360° rotation of the cam into equal divisions and into equal rise and fall increments.

As one box is filled, it may conveniently be lifted off the channel 194, and an empty box may be substituted.

It is within the scope of this invention to supply the yarn from the mandrel directly to a knitting or other fabric-making machine instead of discharging the yarn into the boxes 246 or other containers including the container hereinafter referred to. Alternatively, the yarn instead of being fed directly to the fabric-making machinery may be wound on cones from which the yarn may be supplied to the fabric-making machinery.

Further, it is to be understood that if a plurality of ends of yarn are textured on the mandrel, they may be separated from each other so as to form either separate individual ends of yarn or separate groups of ends of yarn. Also, it will be understood that if the yarn is deposited from the mandrel into the container 246 or other container and is single-ended yarn, it may be either supplied directly from the container to the fabric-making machinery or first wound on cones and supplied from the cones to the fabric-making machinery. On the other hand, if the yarn deposited in the container from the mandrel comprises a plurality of ends of yarn, said ends may be separated and formed either into individulal ends or into groups of ends as the yarn is withdrawn from the container, as hereinafter described, and supplied in said separated condition either directly to the fabric-making machinery or wound on cones for subsequent supply to such machinery.

The frame has three horizontal bars 252, 254 and 256. Two platforms, 258 and 260, and a bracket 262 are supported by the bar 252 and a rear bar (not shown). Two platforms 264 and 266 and a bracket 268 are supported by the bar 254 and a rear bar (not shown). A platform 270 is supported by the bar 256 and a rear bar (not shown). A bar 272 is supported by the frame and the bracket 262, and a bar 274 is supported by the frame and the bracket 268. Eight cones of yarn are supported on a plurality of rods 276 fixed to the bars 272, 252, 274, and 254. The cones 278, 280, 282 and 284 serve as direct supply cones, while the cones 286, 288, 290 and 292 serve as back up cones for the supply cones.

As previously described in the embodiment of FIG. 8, the ends are passed over suitable horizontal bars, between guide posts, through tension devices, and brought around a guide post 294 to a yarn winding assembly 296 and a heating chamber assembly 298, mounted on the platform 270. The four ends are wound around a mandrel 300 by the yarn winding assembly, heated by the heating chamber assembly, and cooled on the down-hanging portion 300a of the mandrel. A horizontal rod is fixed to the underside of the platform 270, and crosses the mandrel portion 300a, precluding its rotation. The yarn, however, slides down the mandrel past the rod. Four cone winders 302, 304, 306 and 308 of well known construction are respectively mounted on the platforms 258, 260, 264 and 266. A motor 309 is fixed below and between the platforms 258 and 260, and is coupled by suitable pulleys and a single belt to each of the cone winders, which are thus each driven at the same speed. The cone winders have the customary spindles for rotating the cones, and the geared traversing mechanism for traversing the yarn up and down the cone as it is wound around the cone. Two horizontal guide posts 310 and 312 are mounted by brackets below the cone winders. Four horizontal posts 314 and an eye tube 316 are mounted by a bracket below the cone winders. Two spaced apart brackets 318 and 320 are fixed between the mandrel 300 and the eye tube 316. A photoelectric source 322 and a detector 324 are mounted to the upper portion of the brackets respectively, and a photoelectric source 326 and a detector 328 are mounted to the lower portion of the brackets respectively.

The cooling yarn 10, having four ends, is pushed off the hanging down portion 300a of the mandrel, is passed between the two brackets 318 and 320 and through the eye tube 316, and is warped sequentially between the four rods 314. From the rods 314, the yarn ends are separated into two groups by the laterally spaced posts 310a and 310b, respectively, which depend from the bracket 310. One of the ends of one of the groups extend upwardly from the post 310a to cone winder 302 and the other end of said pair extends upwardly to cone winder 306. The ends of the other pair extend from the post 310b to a post 312a depending from a bracket 312. From the post 312a one end is supplied to the cone winder 304 and the other end of said pair of ends is supplied to the cone winder 308. The posts 314 serve to tension the yarn as it travels from said posts to the brackets 310 and 312 so that the yarn is considerably straightened out from its helical configuration imparted thereto by the winding of the yarn ends around the mandrel. Posts 314 also serve the important function of preventing the force which attends said straightening out of the yarn from being transmitted to the loop of yarn between the mandrel 14 and the eye tube 316 and thus prevents twisting of said loop upon itself which would be highly undesirable. The hanging loop of yarn is normally disposed between the two sets of photo detectors, which control the speed of the cone winder motor 309. If the yarn intercepts the light to the upper detector 324, the motor is slowed to lower the loop. If the yarn intercepts the light to the lower detector 328, the motor is speeded to raise the loop. It will thus be seen that the embodiment of FIG. 12 textures the yarn and unravels and winds the yarn without intermediate storage.

Another embodiment of a storage container for the textured yarn is shown in FIGS. 16 and 17. A circular, open topped container 330 is disposed on a turntable 332 having a bearing 334 mounted for rotation on a spindle 336 fixed to a platform 340. The periphery of the turntable 332 is engaged and driven by a spindle 342 mounted for rotation in bearings 344 fixed to the platform 340. An airtube 346 is mounted in a post 348 fixed to the platform and directs air from a source, not shown, against the blades of a fan rotor 350 which is fixed to the spindle 342. A constant rate of air flow from the airtube 346 will thus rotate the container 330 at a constant rate.

The container is disposed below the hanging-down portion of the mandrel 14a. It is necessary that the yarn be laid down in the circular container as equal amounts of yarn on equal areas of the container bottom, regardless of where that area may be. Therefore, a cam 352 must be provided which will deflect the down-hanging portion 14a of the mandrel to sweep out equal areas with equal amounts of yarn as the container is rotated. The cam is rotated about a shaft 354 which is rotated at a constant rate by a suitable means, not shown. A hollow core 356 may be inserted in the center of the receptacle to simplify the tolerances required in laying out the yarn.

To construct the cam 352 when a central core is not used in the container, any convenient sector is used, as AHJ in FIG. 20.

(1) $AB=BD=DF=FH$.
(2) $AK=KB=BM=MD=DP=PF=FR=RH$.
(3) Arc $MN$/Arc $KL=x$. Arc $PQ$/Arc $KL=y$. Arc $RS$/Arc $KL=z$.
(4) $T=1+x+y+z$.
(5) Assume Arc $KL$ as the unit arc length.
(6) Then, $180/T$=degrees per unit arc length.
(7) Arc $KL$ requires $180/T$ degrees.
(8) Arc $MN$ requires $$\frac{180}{T} \times x \text{ degrees}$$

(9) Arc $PQ$ requires $$\frac{180}{T} \times y \text{ degrees}$$

(10) Arc $RS$ requires $$\frac{180}{T} \times z \text{ degrees}$$

(11) Select a convenient size circle, as shown in FIG. 21.
(12) Draw a radial line 0.2 at the angle given by Equation 7.
(13) Draw a radial line 0.3 at the angle given by Equation 8.
(14) Draw a radial line 0.4 at the angle given by Equation 9.
(15) Draw a radial line 0.5 at the angle given by Equation 10, which will complete 180°.
(16) Bisect each of the resulting angles. For example, line 0.6 bisects the angle 1.0.2.
(17) $H.A=10.11$
(18) $H.K=12.13$
(19) $H.M=14.15$
(20) $H.P=16.17$
(21) $H.R=18.19$
(22) Point 20 is on the base circle.
(23) Connect points 11, 13, 15, 17, 19, 20 with a smooth curve.
(24) The other half of the cam is a mirror image of the above-constructed half.

To construct the cam 352 when a central core or insert 356 is used in the container, a procedure similar to the foregoing is followed, with the following revisions:

Let AB be the radius of the central core 356.

Then (3) becomes (3a):

(3a)  Arc PQ/Arc MN=$y'$  Arc RS/Arc MN=$z'$

And (4) becomes (4a):

(4a)  $T=1+y'+z'$

While (5) becomes (5a):

(5a) Assume Arc MN as the unit arc length.

Now proceed in the same manner as before; this time only three areas are considered instead of four.

These methods are approximations which are adequate for this work. If greater accuracy is desired, HA or HB, as the case may be, may be divided into smaller lengths.

A cam 352 constructed as shown in FIGS. 20 and 21 will lay down the yarn as shown in FIG. 16. Of course, as the yarn is pushed down the mandrel, it will pass between the mandrel and the cam.

It should be noted that the cams 248 and 352 may be utilized to guide the mandrel 14 without a direct drive to the shaft of the cam. As the yarn is advanced along the hanging down portion of the mandrel and is concurrently pressed against the peripheral surface of the cam by the tendency of the mandrel to rotate, it will rotate the cam about its shaft. The result will be a uniform peripheral velocity drive of the cam rather than a uniform rotational velocity drive of the cam. The designs of the cam as shown for uniform rotational velocity drive may be used as an approximation, or the cams may be designed for uniform peripheral velocity.

The product of the apparatuses discussed above is a yarn which under no tension is a somewhat flattened helix, having two sharp kinks or reflexes per turn of yarn if formed over a mandrel such as is shown in FIG. 6, or one sharp kink per turn if formed over a mandrel such as is shown in FIG. 7. When the yarn is placed under tension, the helix tends to pull out into a straight line, but the kinks provide permanent stress concentrations which cause the helix to pull out into a zig-zag configuration. This zig-zag configuration remains until the yarn fails in tension.

The mandrel 14 shown in FIG. 22 is mounted so that its angularly related portion 14a extends upwardly instead of downwardly. In this modification, the mandrel portion 14a extends into a tube 355 which has an inner diameter which is slightly larger in diameter than the diameter of the yarn helix. This tube prevents the rotation of the mandrel 14 which might otherwise possibly occur when the spinner rotates. The tube 355 is preferably transparent, and for that purpose may be made of glass or any suitable plastic, so that the winding in the tube may be observed. It is to be noted that the helical winding moves upwardly in tube 355 under the force of the successive winding formations on the mandrel at the tip of the cone 62. The yarn may be transmitted from the upper end of the tube 355 either to cone winders, or to fabric-knitting or other fabric-making machines, with intermediate separating of the yarn ends as described above with reference to FIGS. 12, 12A and 12B. Also, two vertically spaced sets of light sources and photodetectors 357 and 358, and 360 and 362, respectively, are preferably positioned in relation to tube 355 for providing suitable control of either the speed of the cone winders or the speed of the spinner rotor 46. In the case of the control of the cone winder motor, as described above with reference to FIG. 12, the control would preferably be such as to increase the windup speed of the cone winders. In the case of the control of the spinner rotor, the photodetectors would be connected to a valve (not shown) for regulating the supply of compressed air to the spinner rotor.

It will be understood that the present invention may be employed for texturing any yarn which can be set by the application of heat followed by cooling of the yarn to normal temperature. The invention is also applicable to plied yarn which is capable of being set by heat followed by cooling to normal temperature.

The apparatus of the present invention may be provided with means for controlling the temperature to which the yarn is heated. This may be done, for example, by varying the current supply to the heating element 100, under the control of a thermostat positioned adjacent the mandrel in the heating chamber or by providing a valve for controlling the flow of the superheated steam in the yarn heating chamber, this valve being under the control of a thermostat disposed adjacent the mandrel in the heating chamber. It is also possible to control the temperature to which the yarn is heated by providing the steam inlet tube 114 with a valve adjustable under the control of a thermostat disposed in the heating chamber adjacent the mandrel.

It may be noted that in FIG. 22 the yarn in the tube 355 is shown, for the purpose of clarity, as enlarged in diameter. Normally, the yarn is of the same diameter as it is on the mandrel portion 14a and might even be slightly compressed in the tube 355.

While we have shown and described the preferred embodiment of our invention including several forms thereof in the case of the apparatus and several ways in which the method of our invention may be practiced, it will be understood that we do not wish to be limited to such forms of apparatus and ways of practicing the invention except to the extent required by the scope of the appended claims.

What is claimed is:

1. Apparatus for texturing yarn, comprising: a mandrel having a longitudinal axis and an elongated marginal edge portion; spinning means having a longitudinal axis coaxial with said axis of said mandrel for rotation about said longitudinal axis of said spinning means, and having an eccentric guide for the passage of the yarn therethrough, said elongated marginal edge portion being thin in cross-section, approaching a sharp, but not cutting edge, so that as said spinning means rotates, the yarn is wound around said mandrel successively in close engagement with at least a longitudinally extending portion of said thin edge portion of the mandrel and is thereby kinked at a multiplicity of points spaced from each other longitudinally of the yarn.

2. Apparatus for texturing yarn, comprising: a mandrel having a longitudinal axis and an elongated marginal edge portion; spinning means having a longitudinal axis coaxial with said axis of said mandrel for rotation about said longitudinal axis of said spinning means and having an eccentric guide for the passage of the yarn therethrough, said elongated marginal edge portion being thin in cross-section, approaching a sharp, but not cutting edge, so that as said spinning means rotates, the yarn is wound around said mandrel successively in close engagement with at least a longitudinally extending portion of said thin edge portion of the mandrel and is thereby kinked at a multiplicity of points spaced from each other longitudinally of the yarn; heating means adjacent said mandrel for heating the closely wound yarn on said mandrel; and cooling means adjacent said mandrel for cooling the heated yarn on said mandrel.

3. Apparatus for texturing yarn, comprising: a mandrel having a longitudinal axis and two elongated marginal edge portions; spinning means having a longitudinal axis coaxial with said axis of said mandrel for rotation about said longitudinal axis of said spinning means, and having an eccentric guide for the passage of the yarn therethrough, said elongated marginal edge portions being thin in cross-section, approaching a sharp, but not cutting edge, so that as said spinning means rotates, the yarn is wound around said mandrel successively in close engagement with at least a longitudinally extending portion of said thin edge portions of the mandrel and is thereby kinked at a multiplicity of points spaced from each other longitudinally of the yarn.

4. Apparatus for texturing yarn, comprising: a mandrel having a longitudinal axis and two elongated marginal edge portions; spinning means having a longitudinal axis coaxial with said axis of said mandrel for rotation about said longitudinal axis of said spinning means, and having an eccentric guide for the passage of the yarn therethrough, said elongated marginal edge portions being thin in cross-section, approaching a sharp, but not cutting edge, so that as said spinning means rotates, the yarn is wound around said mandrel successively in close engagement with at least a longitudinally extending portion of said thin edge portions of the mandrel and is thereby kinked at a multiplicity of points spaced from each other longitudinally of the yarn; heating means adjacent said mandrel for heating the closely wound yarn on said mandrel; and cooling means adjacent said mandrel for cooling the heated yarn on said mandrel.

5. Apparatus for texturing yarn, comprising: a housing having a longitudinal bore therethrough; a tubular spinning member mounted for rotation within said housing bore, the wall of said member having a longitudinal bore therethrough for the passage of the yarn therethrough; a shaft mounted for rotation within said tubular spinning member, and having a cone shaped portion extending at least in part beyond one end of said longitudinal bore of said tubular spinning member, the smallest diameter of said cone shaped portion being furthest from said bore; a mandrel fixed to said cone shaped portion at said smallest diameter, and having an elongated marginal edge portion which is thin in cross-section, approaching a sharp, but not cutting edge; whereby as said spinning member is rotated, the yarn is spiraled over said cone shaped portion and is wound around said mandrel, and is kinked as it passes around said elongated marginal edge portion.

6. Apparatus for texturing yarn comprising: a housing having a longitudinal bore therethrough; a tubular spinning member mounted for rotation within said housing bore, the wall of said member having a longitudinal bore therethrough for the passage of the yarn therethrough; a shaft mounted for rotation within said tubular spinning member, and having a cone shaped portion extending at least in part beyond one end of said longitudinal bore of said tubular spinning member, the smallest diameter of said cone shaped portion being furthest from said bore; a mandrel fixed to said cone shaped portion at said smallest diameter, and having an elongated marginal edge portion which is thin in cross-section, approaching a sharp, but not cutting edge; whereby as said spinning member is rotated, the yarn is spiraled over said cone shaped portion and is wound around said mandrel, and is kinked as it passes around said elongated marginal edge portion; heating means adjacent said mandrel for heating the kinked yarn on said mandrel; and cooling means adjacent said mandrel for cooling the heated yarn on said mandrel.

7. Apparatus for texturing yarn comprising: a housing having a longitudinal bore therethrough; a tubular spinning member mounted for rotation within said housing bore, the wall of said member having a longitudinal bore therethrough for the passage of the yarn therethrough; a shaft mounted for rotation within said tubular spinning member, and having a cone shaped portion extending at least in part beyond one end of said longitudinal bore of said tubular spinning member, the smallest diameter of said cone shaped portion being furthest from said bore; a mandrel fixed to said cone shaped portion at said smallest diameter, and having two antipodal elongated marginal edge portions which are thin in cross-section, approaching a sharp, but not cutting edge; whereby as said spinning member is rotated, the yarn is spiraled over said cone shaped portion and is wound around said mandrel, and is kinked as it passes around said elongated marginal edge portions.

8. Apparatus for texturing yarn comprising: a housing having a longitudinal bore therethrough; a tubular spinning member mounted for rotation within said housing bore, the wall of said member having a longitudinal bore therethrough for the passage of the yarn therethrough; a shaft mounted for rotation within said tubular spinning member, and having a cone shaped portion extending at least in part beyond one end of said longitudinal bore of said tubular spinning member, the smallest diameter of said cone shaped portion being furthest from said bore; a mandrel fixed to said cone shaped portion at said smallest diameter, and having two antipodal elongated marginal edge portions which are thin in cross-section, approaching a sharp, but not cutting edge; whereby as said spinning member is rotated, the yarn is spiraled over said cone shaped portion and is wound around said mandrel, and is kinked as it passes around said elongated marginal edge portions; heating means adjacent said mandrel for heating the kinked yarn on said mandrel; and cooling means adjacent said mandrel for cooling the heated yarn on said mandrel.

9. Apparatus for texturing yarn comprising: a housing having a longitudinal bore therethrough; a tubular spinning member, having a rotor portion, mounted for rotation within said housing bore, the wall of said member having a longitudinal bore therethrough for the passage of the yarn therethrough; fluid supply means having an outlet within said housing bore for directing a flow of fluid to said rotor portion for rotating said spinning member; a shaft mounted for rotation within said tubular spinning member, and having a cone shaped portion extending at least in part beyond one end of said longitudinal bore of said tubular spinning member, the smallest diameter of said cone shaped portion being furthest from said bore; a mandrel fixed to said cone shaped portion at said smallest diameter and having an elongated marginal edge portion; whereby as said spinning member is rotated, the yarn is spiraled over said cone shaped portion and is wound around said mandrel, and is kinked as it passes around said elongated marginal edge portion, each succeeding turn of yarn as it is wound onto the mandrel advancing the preceding turns along said mandrel.

10. Apparatus for texturing yarn comprising: a housing having a longitudinal bore therethrough; a tubular spinning member, having a rotor portion, mounted for rotation within said housing bore, the wall of said member having a longitudinal bore therethrough for the passage of the yarn therethrough; a fluid supply means having an outlet within said housing bore for directing a flow of fluid to said rotor portion for rotating said spinning member; a shaft mounted for rotation within said tubular spinning member, and having a cone shaped portion extending at least in part beyond one end of said longitudinal bore of said tubular spinning member, the smallest diameter of said cone shaped portion being furthest from said bore; a mandrel fixed to said cone shaped portion at said smallest diameter, and having an elongated marginal edge portion; whereby as said spinning member is rotated, the yarn is spiraled over said cone shaped portion and is wound around said mandrel, and is kinked as it passes around said elongated marginal edge portion, each succeeding turn of yarn as it is wound onto the mandrel advancing the preceding turns along said mandrel; heating means adjacent said mandrel and spaced from said cone shaped portion for heating the kinked yarn as it is advanced along said mandrel; and cooling means adjacent said mandrel and further spaced from said cone shaped portion for cooling the heated yarn as it is advanced along said mandrel.

11. Apparatus for texturing yarn comprising: a housing having a longitudinal bore therethrough; a tubular spinning member, having a rotor portion, mounted for rotation within said housing bore, the wall of said member having a longitudinal bore therethrough for the passage of the yarn therethrough; fluid supply means having an outlet within said housing bore for directing a flow of fluid to said rotor portion for rotating said spinning member; a shaft mounted for rotation within said tubular spinning member, and having a cone shaped portion extending at least in part beyond one end of said longitudinal bore of said tubular spinning member, the smallest diameter of said cone shaped portion being furthest from said bore; a mandrel fixed to said cone shaped portion at said smallest diameter, and having two antipodal elongated marginal edge portions; whereby as said spinning member is rotated, the yarn is spiraled over said cone shaped portion and is wound around said mandrel, and is stressed as it passes around said elongated marginal edge portions, each succeeding turn of yarn as it is wound onto the mandrel advancing the preceding turns along said mandrel.

12. Apparatus for texturing yarn comprising: a housing having a longitudinal bore therethrough; a tubular spinning member, having a rotor portion, mounted for rotation within said housing bore, the wall of said member having a longitudinal bore therethrough for the passage of the yarn therethrough; fluid supply means having an outlet within said housing bore for directing a flow of fluid to said rotor portion for rotating said spinning member; a shaft mounted for rotation within said tubular spinning member, and having a cone shaped portion extending at least in part beyond one end of said longitudinal bore of said tubular spinning member, the smallest diameter of said cone shaped portion being furthest from said bore; a mandrel fixed to said cone shaped portion at said smallest diameter, and having two antipodal elongated marginal edge portions; whereby as said spinning member is rotated, the yarn is spiraled over said cone shaped portion and is wound around said mandrel, and is kinked as it passes around said elongated edges, each succeeding turn of yarn as it is wound on the mandrel advancing the preceding turns along said mandrel; heating means adjacent said mandrel and spaced from said cone shaped portion for heating the wound yarn as it is advanced along said mandrel; and cooling means adjacent said mandrel and further spaced from said cone shaped portion for cooling the heated yarn as it is advanced along said mandrel.

13. Apparatus for texturing yarn comprising: a housing having a longitudinal bore therethrough; a tubular spinning member mounted for rotation within said housing bore, the wall of said member having a longitudinal bore therethrough; a shaft mounted for rotation within said tubular spinning member, and having a cone shaped portion being furthest from said bore; a mandrel, having an elongated edge which is thin in cross-section, approaching a sharp, but not cutting edge, fixed to said cone shaped portion at said smallest diameter by a first portion which is coaxial with said shaft, and having a swingable second portion at an angle to said shaft; and means for controlling the swinging of said second portion with respect to the axis of said first portion.

14. Apparatus for texturing yarn comprising: a housing having a longitudinal bore therethrough; a tubular spinning member mounted for rotation within said housing bore, the wall of said member having a longitudinal bore therethrough; a shaft mounted for rotation within said tubular spinning member, and having a cone shaped portion extending at least in part beyond one end of said longitudinal bore of said tubular spinning member, the smallest diameter of said cone shaped portion being furthest from said bore; a mandrel fixed to said cone shaped portion at said smallest diameter by a first portion which is coaxial with said shaft, and having a second portion at an angle to said shaft, whereby as said spinning member is rotated, the yarn is spiraled over said cone shaped portion and is closely wound around the portion of said mandrel closest to said cone, the succeeding turns advancing the preceding turns along said mandrel; a container under said second mandrel portion for receiving the yarn as it is advanced off said second mandrel portion; first means for moving said container with respect to said second mandrel portion; and second means for moving said second mandrel portion with respect to said container.

15. Apparatus for texturing yarn comprising: a housing having a longitudinal bore therethrough; a tubular spinning member mounted for rotation within said housing bore, the wall of said member having a longitudinal bore therethrough; a shaft mounted for rotation within said tubular spinning member, and having a cone shaped portion extending at least in part beyond one end of said longitudinal bore of said tubular spinning member, the smallest diameter of said cone shaped portion being furthest from said bore; a mandrel fixed to said cone shaped portion at said smallest diameter by a first portion which is coaxial with said shaft, and having a second portion at an angle to said shaft, whereby as said spinning member is rotated, the yarn is spiraled over said cone shaped portion and is closely wound around the portion of said mandrel closest to said cone, the succeeding turns advancing the preceding turns along said mandrel; a container under said second mandrel portion for receiving the yarn as it is advanced off said second mandrel portion; first means for moving said container to and fro and at substantially a constant speed with respect to movement of said second mandrel portion; and second means for moving said second mandrel portion transversely rectilinearly to and fro at a variable rate with respect to said movement of said container.

16. Apparatus for texturing yarn comprising: a housing having a longitudinal bore therethrough; a tubular spinning member mounted for rotation within said housing bore, the wall of said member having a longitudinal bore therethrough; a shaft mounted for rotation within said tubular spinning member, and having a cone shaped portion extending at least in part beyond one end of said longitudinal bore of said tubular spinning member, the smallest diameter of said cone shaped portion being furthest from said bore; a mandrel fixed to said cone shaped portion at said smallest diameter by a first portion which is coaxial with said shaft, and having a second portion at an angle to said shaft, whereby as said spinning member is rotated, the yarn is spiraled over said cone shaped portion and is closely wound around the portion of said mandrel closest to said cone, the succeeding turns advancing the preceding turns along said mandrel; a container under said second mandrel portion for receiving the yarn as it is advanced off said second mandrel portions; first means for rotating said container about a fixed axis at a substantially constant speed; and second means for moving said second mandrel portion transversely to and fro at a variable rate with respect to said rotation of said container.

17. Apparatus for texturing yarn comprising: a housing having a longitudinal bore therethrough; a tubular spinning member mounted for rotation within said housing bore, the wall of said member having a longitudinal bore therethrough; a shaft mounted for rotation within said tubular spinning member, and having a cone shaped portion extending at least in part beyond one end of said longitudinal bore of said tubular spinning member, the smallest diameter of said cone shaped portion being furthest from said bore; a mandrel fixed to said cone shaped portion at said smallest diameter by a first portion which is coaxial with said shaft and having a second portion which is at an angle to said shaft, whereby as said spinning member is rotated, the yarn is spiraled over said cone shaped portion and is closely wound around the portion of said mandrel closest to said cone, the succeeding turns advancing the preceding turns along said mandrel and eventually off the distal end of said mandrel second portion; a container for receiving the yarn disposed below said distal end of said mandrel second portion; and means for providing said container and said mandrel second portion with relative motion whereby said distal end of said mandrel second portion sweeps out equal distances on equal areas of the bottom of said container.

18. A method of texturing yarn comprising: closely winding the yarn into a helix about a portion of a mandrel having at least one sharp edge, thereby providing each turn of the yarn with at least one kink advancing the helix longitudinally, without rotation, along the mandrel; permanently setting the kink in the yarn; and removing the yarn from the mandrel.

19. A method of texturing yarn comprising: closely winding the yarn into a helix about a portion of a mandrel having at least one sharp edge, thereby providing each turn of the yarn with at least one kink advancing the helix longitudinally, without rotation, along the mandrel; heating the kinked yarn; cooling the heated yarn to permanently set the kinks; and removing the yarn from the mandrel.

20. A method of texturing yarn comprising: closely winding the yarn into a helix about a mandrel having at least one sharp edge, thereby providing each turn of the yarn with at least one kink advancing the helix longitudinally, without rotation, along the mandrel; heating the kinked yarn; rapidly cooling the heated yarn to permanently set the kinks; and removing the yarn from the mandrel.

21. A method of texturing a plurality of ends of yarn concurrently comprising: closely winding the plurality of ends of yarn, in parallel and in phase, into a helix about a portion of a mandrel having at least one sharp edge, thereby providing each turn of each of the ends of yarn with at least one kink; heating the kinked plurality of ends of yarn advancing the helix longitudinally, without rotation, along the mandrel; cooling the heated plurality of ends of yarn to permanently set the kinks; removing the plurality of ends of yarn from the mandrel; separating apart the plurailty of ends of yarn.

22. A method of texturing a plurality of ends of yarn concurrently comprising: closely winding the plurality of ends of yarn, in parallel and in phase, into a helix about a portion of a mandrel having at least one sharp edge, thereby providing each turn of each of the ends of yarn with at least one kink; heating the kinked plurality of ends of yarn advancing the helix longitudinally, without rotation, along the mandrel; rapidly cooling the heated plurality of ends of yarn to permanently set the kinks; removing the plurality of ends of yarn from the mandrel; separating apart the plurality of ends of yarn.

23. Apparatus for texturing yarn, comprising: a mandrel having a longitudinal axis and an elongated marginal edge portion substantially parallel to said axis; spinning means having a longitudinal axis coaxial with said longitudinal axis of said mandrel, mounted for rotation about said longitudinal axis of said spinning means, and having an eccentric guide for the passage of the yarn therethrough; said elongated edge being thin so that as said spinning means rotates the yarn is wound around said mandrel with each turn of the yarn successively in close engagement with a transversely extending portion of said thin edge portion and thereby the yarn is kinked at a multiplicity of points spaced from each other longitudinally of the yarn.

24. Apparatus for texturing yarn, comprising: a mandrel having a longitudinal axis and an elongated thin marginal edge portion substantially parallel to said axis; spinning means mounted for rotation with respect to said mandrel and having an eccentric guide for the passage of the yarn therethrough so that as said spinning means rotates the yarn is wound around said mandrel with each turn of the yarn successively in close engagement with a transversely extending portion of said thin edge portion and thereby the yarn is kinked at a multiplicity of points spaced from each other longitudinally of the yarn.

25. Apparatus for texturing yarn, comprising: a mandrel having a longitudinal axis and an elongated thin marginal edge portion substantially parallel to said axis; spinning means mounted for rotation with respect to said mandrel and having an eccentric guide for the passage of the yarn therethrough so that as said spinning means rotates the yarn is wound around said mandrel with each turn of the yarn successively in close engagement with a transversely extending portion of said thin edge portion and thereby the yarn is kinked at a multiplicity of points spaced from each other longitudinally of the yarn; and setting means adjacent said mandrel and spaced from said eccentric guide for permanently setting the points of stress in the yarn.

26. Apparatus for texturing yarn, comprising: a base; a mandrel mounted for movement with respect to said base about a longitudinal axis and having an elongated thin edge portion substantially parallel to said axis; spinning means mounted for rotation with respect to said mandrel and having an eccentric guide for the passage of the yarn therethrough so that as said spinning means rotates the yarn is wound around said mandrel with each turn of the yarn successively in close engagement with a transversely extending portion of said thin edge portion and thereby the yarn is kinked at a multiplicity of points spaced from each other longitudinally of the yarn.

27. Apparatus for texturing yarn, comprising: a base; a mandrel mounted for movement with respect to said base about a longitudinal axis and having an elongated thin edge portion substantially parallel to said axis; spinning means mounted for rotation with respect to said mandrel and having an eccentric guide for the passage of the yarn therethrough so that as said spinning means rotates the yarn is wound around said mandrel with each turn of the yarn successively in close engagement with a transversely extending portion of said thin edge portion and thereby the yarn is kinked at a multiplicity of points spaced from each other longitudinally of the yarn; and means engaging said mandrel for fixing said mandrel with respect to its longitudinal axis.

28. Apparatus for texturing yarn, comprising: a base; a mandrel mounted for movement with respect to said base about a longitudinal axis and having an elongated thin edge portion substantially parallel to said axis; spinning means mounted for rotation with respect to said mandrel and having an eccentric guide for the passage of the yarn therethrough so that as said spinning means rotates the yarn is wound around said mandrel with each turn of the yarn successively in close engagement with a transversely extending portion of said thin edge portion and thereby the yarn is kinked at a multiplicity of points spaced from each other longitudinally of the yarn; and means engaging said mandrel for pivoting said mandrel with respect to its longitudinal axis.

29. Apparatus for texturing yarn, comprising: a base; means for supplying a plurality of ends of yarn coupled to said base; a mandrel having a longitudinal axis and an elongated thin edge portion substantially parallel to said axis; spinning means mounted for rotation with respect to said mandrel and having an eccentric guide for the passage of the plurality of ends from said supplying means therethrough; whereby as said spinning means rotates the ends of the yarn are twisted about themselves in one direction of rotation and are wound around said mandrel in the opposite direction of rotation with each turn of the yarn successively in close engagement with a transversely extending portion of said thin edge portion and thereby each end of the yarn is kinked at a multiplicity of points spaced from each other longitudinally of the respective end of yarn.

30. Apparatus for texturing yarn, comprising: a base; means for supplying a plurality of ends of yarn coupled to said base; an mandrel having a longitudinal axis and an elongated thin edge portion substantially parallel to said axis; spinning means mounted for rotation with respect to said mandrel and having an eccentric guide for the passage of the plurality of ends from said supplying means therethrough; whereby as said spinning means rotates the ends of the yarn are twisted about themselves in one direction of rotation and are wound around said mandrel in the opposite direction of rotation with each turn of the yarn successively in close engagement with a transversely extending portion of said thin edge portion and thereby each end of the yarn is kinked at a multiplicity of points spaced from each other longitudinally of the respective end of yarn; and means engaging said mandrel for fixing said mandrel with respect to its longitudinal axis.

31. Apparatus for texturing yarn, comprising: a base; means for supplying a plurality of ends of yarn coupled to said base; a mandrel having a longitudinal axis and an elongated thin edge portion substantially parallel to said axis; spinning means mounted for rotation with respect to said mandrel and having an eccentric guide for the passage of the plurality of ends from said supplying means therethrough; whereby as said spinning means rotates the ends of the yarn are twisted about themselves in one direction of rotation and are wound around said mandrel in the opposite direction of rotation with each turn of the yarn successively in close engagement with a transversely extending portion of said thin edge portion and thereby each end of the yarn is kinked at a multiplicity of points spaced from each other longitudinally of the respective end of yarn; and means engaging said mandrel for pivoting said mandrel with respect to its longitudinal axis.

32. In an apparatus for texturing yarn including a mandrel and means for twisting a plurality of ends of yarn about themselves in one direction of rotation and for winding the plurality of twisted ends of yarn about said mandrel in the opposite direction of rotation; a plurality of first tension applying means, each coupled to the leading portion of a respective end of the twisted and wound yarn for pulling the end in a direction away from said mandrel; second tension applying means engaging the twisted and wound yarn between said first tension applying means and said mandrel for applying a drag to each of the ends of yarn in a direction away from said first tension applying means; whereby each of said first tension applying means separates its respective end of yarn from the other ends.

33. In an apparatus for texturing yarn including a mandrel and means for twisting a plurality of ends of yarn about themselves in one direction of rotation and for winding the plurality of twisted ends of yarn about said mandrel in the opposite direction of rotation; a plurality of first tension applying means, each coupled to the leading portion of a respective end of the twisted and wound yarn for pulling the end in a direction away from said mandrel; a plurality of posts disposed between said first tension applying means and said mandrel, the twisted and wound yarn being warped sequentially thereamong, for applying a drag to each of the ends of yarn in a direction away from said first tension applying means; whereby each of said first tension applying means separates its respective end of yarn from the other ends.

34. Apparatus for texturing yarn comprising: a housing having a longitudinal bore therethrough; a tubular spinning member mounted for rotation within said housing bore, the wall of said member having a longitudinal bore therethrough; a shaft mounted for rotation with said tubular spinning member, and having a cone shaped portion extending at least in part beyond one end of said longitudinal bore of said tubular spinning member, the smallest diameter of said cone shaped portion being furthest from said bore; a mandrel fixed to said cone shaped portion at said smallest diameter by a first portion which is coaxial with said shaft, and having a second portion at an angle to said shaft, whereby as said spinning member is rotated, the yarn is spiraled over said cone shaped portion and is closely wound around the portion of said mandrel closest to said cone, the succeeding turns advancing the preceding turns along said mandrel; a tube, having open lower and upper ends, fixed above said second portion of said mandrel, and having an inner diameter slightly greater than the outer diameter of the wound yarn on the distal end of said second portion of said mandrel; said distal end of said second portion of said mandrel being disposed through said open lower end of said tube and thereby precluded from rotation with said shaft, whereby as the preceding turns are advanced towards and off said distal end they are pushed up through said tube by the succeeding turns.

References Cited

UNITED STATES PATENTS

| | | | |
|---|---|---|---|
| 2,878,514 | 3/1959 | Nichols et al. | 18—19 |
| 2,980,959 | 4/1961 | Genovese | 18—19 |
| 3,039,259 | 6/1962 | Lenoble | 57—34 |
| 3,050,819 | 8/1962 | Allman et al. | 28—1 |
| 3,055,165 | 9/1962 | Richards | 57—29 |
| 3,071,917 | 1/1963 | Fischer | 57—34 X |
| 3,132,380 | 5/1964 | Wilcken | 18—19 |
| 3,145,523 | 8/1964 | Burbank | 57—34 X |
| 3,147,578 | 9/1964 | Calizzano | 57—34 |

OTHER REFERENCES

German application 1,121,311, Jan. 4, 1962.
German application 1,126,593, Mar. 29, 1962.

FRANK J. COHEN, *Primary Examiner.*

D. E. WATKINS, *Assistant Examiner.*